United States Patent [19]

Schoroth

[11] Patent Number: 5,608,168
[45] Date of Patent: Mar. 4, 1997

[54] TEMPERATURE COMPENSATION IN A REGULATED HEAT CONDUCTION VACUUM GAUGE

[75] Inventor: Anno Schoroth, Konigswinter, Germany

[73] Assignee: Leybold Aktiengesellschaft, Hanau, Germany

[21] Appl. No.: 522,278

[22] PCT Filed: Feb. 25, 1994

[86] PCT No.: PCT/EP94/00533

§ 371 Date: Sep. 13, 1995

§ 102(e) Date: Sep. 13, 1995

[87] PCT Pub. No.: WO94/21993

PCT Pub. Date: Sep. 29, 1994

[30] Foreign Application Priority Data

Mar. 17, 1993 [DE] Germany .......................... 43 08 434.6

[51] Int. Cl.⁶ .............................................. G01L 21/12
[52] U.S. Cl. .................................. 73/755; 73/204.19
[58] Field of Search ...................... 73/755, 204.19, 73/204.16, 708

[56] References Cited

U.S. PATENT DOCUMENTS

| | | | |
|---|---|---|---|
| 2,726,546 | 12/1955 | King, Jr. ............................ | 73/304.19 |
| 4,373,387 | 2/1983 | Nishimura et al. ................. | 73/204.19 |
| 4,492,123 | 1/1985 | Reich .................................. | 73/755 |
| 4,729,242 | 3/1988 | Reich et al. ........................ | 73/755 |
| 4,787,251 | 11/1988 | Kolodjski ........................... | 73/755 |
| 4,920,793 | 5/1990 | Djorup ................................ | 73/170.12 |
| 5,069,066 | 12/1991 | Djorup ................................ | 73/204.15 |

FOREIGN PATENT DOCUMENTS

| | | | |
|---|---|---|---|
| 403355926 | 11/1991 | Japan ................................. | 73/755 |
| 2105472 | 3/1983 | United Kingdom . | |

*Primary Examiner*—Hezron E. Williams
*Assistant Examiner*—Paul D. Amrozowicz
*Attorney, Agent, or Firm*—Harris Beach & Wilcox, LLP

[57] ABSTRACT

The invention relates to a process for operating a regulated heat conduction vacuum gauge with a Wheatstone bridge (1) powered by a controllable supply voltage and a gauge filament (6) and a resistance (9) as two of its components among others, designed to be temperature-dependant to compensate for interference effects of the ambient temperature on the gauge filament (6) and to a suitable circuit for implementing this process; it is proposed, in order to improve and simplify the temperature compensation, that, by linking various electrical measurements of the bridge (1) or by equivalent approximation systems, the value or the temperature of the temperature-dependant resistance (9) be found and taken into account in determining the pressure measurements (drawing FIG. 2).

8 Claims, 3 Drawing Sheets

TEMPERATURE COMPENSATION IN A REGULATED HEAT CONDUCTION VACUUM GAUGE

BACKGROUND OF THE INVENTION

The invention relates to a process for operating a regulated heat conduction vacuum gauge with a Wheatstone bridge powered by a controllable supply voltage and a gauge filament and a resistor as two of its components among others, designed to be temperature-dependant to compensate for interference effects of the ambient temperature on the gauge filament. Moreover, the invention relates to circuits suitable for implementation of this process.

Heat conduction vacuum gauges utilize the effect, that from a temperature-dependant resistance element, more heat is lost at high gas pressures, i.e. at higher particle densities, compared to lower gas pressures. In the heat conduction vacuum gauge after Pirani, the temperature-dependant resistance element is a gauge filament which is part of a Wheatstone bridge. In the unregulated Pirani vacuum gauge, a change in the resistance of the gauge filament unbalances the bridge whereby this imbalance is taken as a measure for the pressure. In the regulated Pirani gauge, the supply voltage which is applied to the bridge is continuously regulated in such a manner, that the resistance and thus the temperature of the gauge filament remains constant, irrespectively of the heat loss. The current required to maintain the resistance value at a constant level is a measure for the heat conduction and thus for the pressure of the gas. Commonly, the Wheatstone bridge is aligned for minimum imbalance by readjusting the supply voltage applied to the bridge accordingly. The bridge supply voltage thus represents the primary electrical quantity which corresponds to the pressure.

The ambient temperature of the gauge filament has an interfering effect on this measurement principle, since it also has an influence on the thermal equilibrium of the gauge filament and its surroundings via thermal radiation and thermal conductance. In order to compensate this interfering influence of the ambient temperature, it is known to include in one of the arms of the Wheatstone bridge a temperature-dependant resistance having a suitable characteristic. However, this kind of temperature compensation is inadequate, since it would have to depend with different characteristics on the pressure of the gas. Commonly, the characteristic is selected in such a manner that it is optimized for atmospheric pressure. At low pressures an incorrect compensation is thus unavoidable.

SUMMARY OF THE INVENTION

From DE-PS 32 30 405 it is known to assign to the temperature-dependant resistance in the Wheatstone bridge, a further temperature-dependant resistance which is not part of the bridge and which is supplied with a constant voltage. Besides the additional temperature-dependant component in the measuring cell, this solution requires an additional constant voltage power supply which necessitates a further connecting line between the measuring cell and the measuring instrument.

The present invention is based on the task of improving or simplifying the temperature compensation during the operation of regulated heat conduction vacuum gauges.

BRIEF DESCRIPTION OF THE DRAWINGS

In an operating process of the aforementioned kind, this task is solved by linking various electrical measurement quantities of the bridge to determine the value or the temperature of the temperature-dependant resistance and take it into account in the formation of the measured pressures. The absolute value of the temperature-dependant resistance which was not accounted for in previous solutions, permits a continual formation of correction signals which take account of the temperature-dependence and thus can be utilized in the formation of precise measurement values. Additional components in the measuring cell and an additional constant voltage power supply for the measuring cell are not required.

Further advantages and details of the present invention shall be explained on the basis of drawing FIG. 1 to 7, of which drawing

Figure 1:
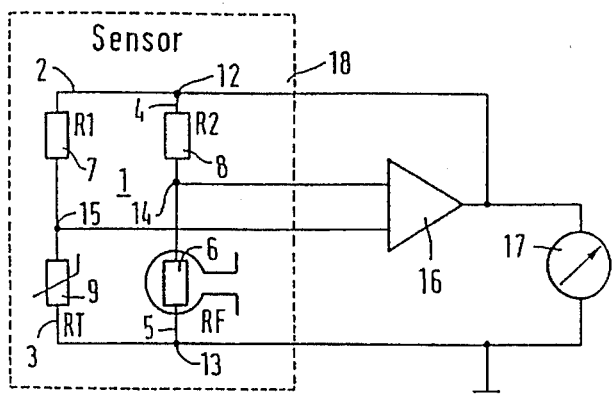
FIG. 1 shows a circuit according to the present state-of-the-art and where

The circuit shown in drawing FIG. 1 comprises Wheatstone bridge 1 with its branches 2 to 5. Placed in these branches are gauge filament 6 ($R_F$) and resistances 7 ($R_1$), 8 ($R_2$) and 9 ($R_T$). Between the branches there are located terminals 12 to 15, whereby terminals 12, 13 form the supply diagonal and terminals 14, 15 the measurement diagonal. The regulated supply voltage $U_1$ (cf. drawing FIG. 2) is applied to terminals 12 and 13, whereby terminal 13 is at ground potential. Terminals 14, 15 of the measurement diagonal are connected to the amplifier 16, through which the supply voltage $U_1$ is regulated continuously in such a manner that the resistance of the gauge filament $R_F$ (and thus its temperature) is kept constant, irrespectively of the heat loss. Display unit 17 is provided to display the pressure which corresponds to the supply voltage in a known manner.

The Wheatstone bridge 1 with its gauge filament 6 which is arranged in a suitable housing form the pressure sensor or the measuring cell 18. The further components (supply, processing, display etc.) of which not all are shown are part of a measuring instrument which is linked by a cable to the measuring cell.

Figure 2:
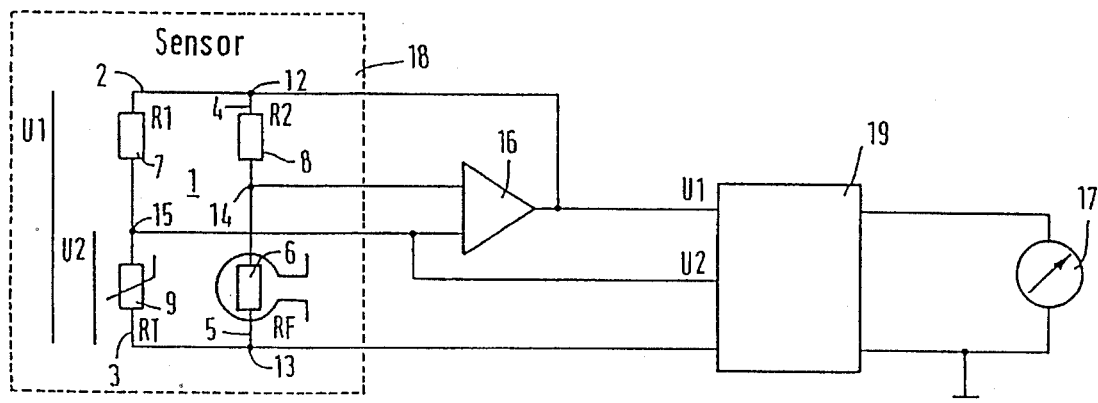
FIGS. 2 to 7 show design examples of circuits according to the present invention.

Shown in drawing FIG. 2 is a circuit according to the present invention in a much generalized way. The purpose of forming the measured value is served by building block 19 which takes into account the momentary value of temperature-dependant resistance 9 in the formation of the measured value. This is performed by supplying to building block 19 suitable information (for example voltage signals $U_1$, regulated supply voltage, and $U_2$, voltage drop across the temperature-dependant resistance 9, or also information on the currents flowing). This information is sufficient for obtaining either directly (by the formation of a voltage signal which corresponds to the temperature of resistance 9) or indirectly (evaluation of the information in a computer building block without separate determination of the ambient temperature) the desired pressure-dependant temperature compensation.

Figure 3:
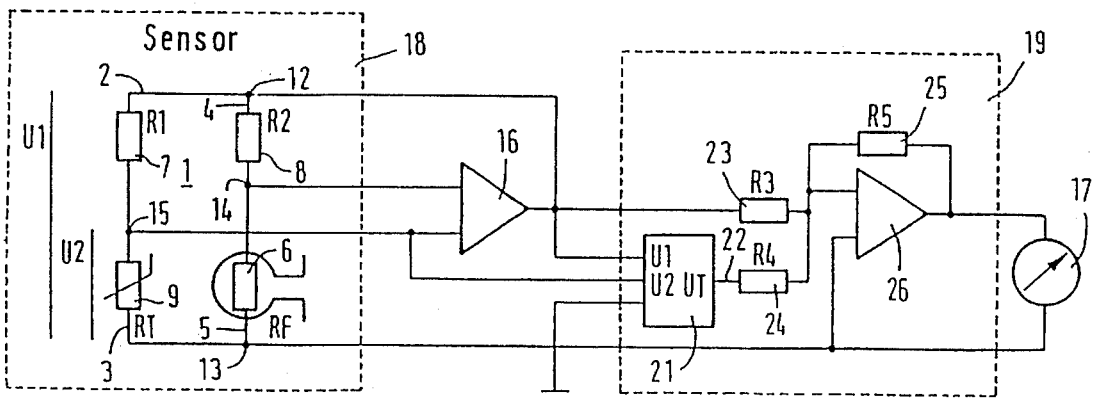

Shown in drawing FIG. 3 is a design option for the building block 19. It in turn comprises a circuit section 21 which processes the bridge supply voltage $U_1$ present across terminals 12 and 13, and the voltage $U_2$ present across temperature-dependant resistance $R_T$ (9) in such a manner that at its output 22 a temperature-dependant voltage $U_T$ is produced which is suitably superimposed on the bridge supply voltage $U_1$ which serves as the measurement quantity, in a further circuit section — consisting of $R_3$ (23), $R_4$ (24), $R_5$ (25) and an amplifier (26). The resulting voltage is then applied to the measuring instrument 17 which is calibrated in terms of gas pressure values.

If $U_T$ is to be proportional to the temperature and thus the temperature-dependant resistance $R_T$ then the following must apply:

$$U_T = K_1 \times R_T \qquad \text{(Eq. 1)}$$

with $K_1$=proportional factor

From the available voltages $U_1$ and $U_2$, $R_T$ can be determined as $$R_T = R_1 \times \frac{U_2}{U_1 - U_2} \text{ with } R_1 = const. \qquad \text{(Eq. 2)}$$

Thus $$U_T = K_2 \times \frac{U_2}{U_1 - U_2} \text{ ; with } K_2 = \text{proportional factor} \qquad \text{(Eq. 3)}$$

As is generally known, resistance $R_T$ is selected in such a manner that it precisely compensates temperature changes at one point of the pressure range (generally atmospheric pressure) of the corresponding Pirani gauge. Resistance $R_4$ (24) is selected in consideration of $R_3$ (23) and $R_5$ (25) so that the correction voltage $U_T$ compensates the temperature influence particularly at low pressures (lower measurement range limit, 'Zero') at a second point within the pressure range.

Through these measures a temperature compensation which depends on the gas pressure is attained over the entire measuring range.

Figure 4:
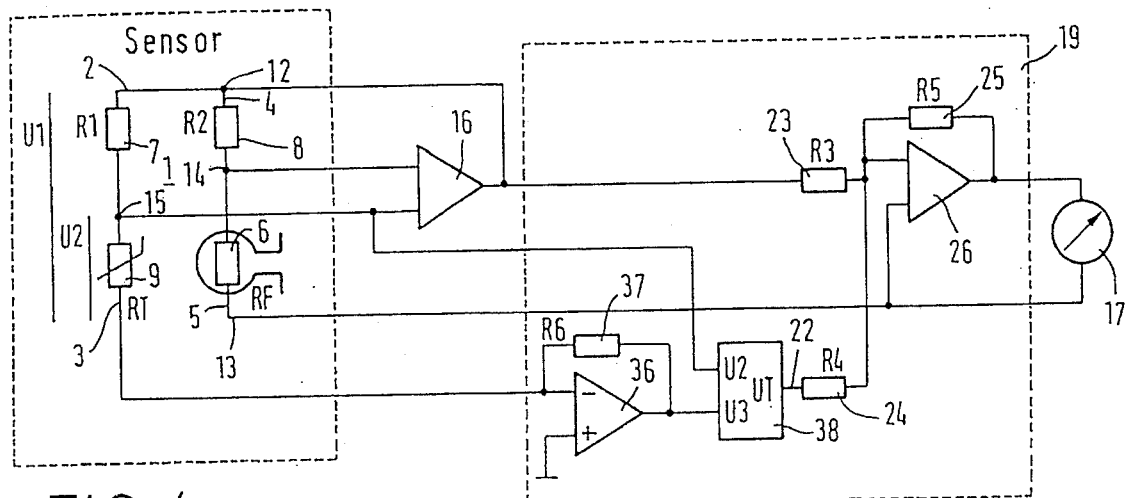

In the design example according to drawing FIG. 4, the value of the temperature-dependant resistance 9 is determined from the values $U_2$ (voltage drop across $R_T$) and I (current through resistance $R_T$). For this purpose, a current-to-voltage converter with amplifier 36 and resistance 37 ($R_6$) is provided. The current flowing through the temperature-dependant resistance (9) flows into one input of the amplifier 36. The second input of the amplifier is connected to ground. Present at the output of the amplifier is a voltage signal $U_3$, the magnitude of which corresponds to the current flowing through the resistance 9. From the voltage drop $U_2$ across the resistance 9 and the value for $U_3$ for the current flowing through the resistance 9, it is possible to determine the value of the resistance by way of combination according to Ohm's Law. This is performed in building block 38 which supplies the temperature-dependant correction voltage $U_T$.

From $U_2$ and with the current $I = -\frac{U_3}{R_6}$ flowing in branch 3 it follows that $$R_T = -\frac{U_2}{U_3} \times R_6 \qquad \text{(Eq. 2')}$$

$$U_T = K'_2 \times \frac{U_2}{U_3} \qquad \text{(Eq. 3')}$$

The voltage $U_T$ is taken into account in the formation of the pressure values in the manner already described for drawing FIG. 3.

Figure 5:
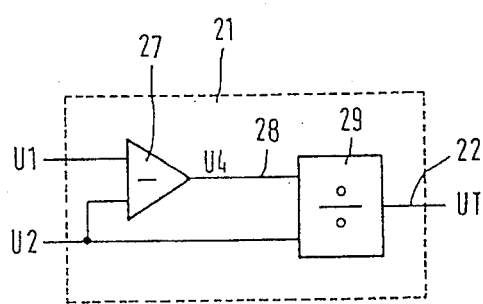

A further embodiment of the circuit section 21 according to drawing FIG. 3 for generation of the temperature-dependant correction voltage $U_T$ is shown in drawing FIG. 5. In an adding circuit 27, the voltage $U_2$ is subtracted from the voltage $U_2$ and one obtains the voltage $U_4$ (28). The voltage $U_2$ is then divided by the voltage U3 in a divider circuit 29 and weighted with the factor $K_2$. The voltage at output 22 is the desired correction voltage $U_T$.

Figure 6:
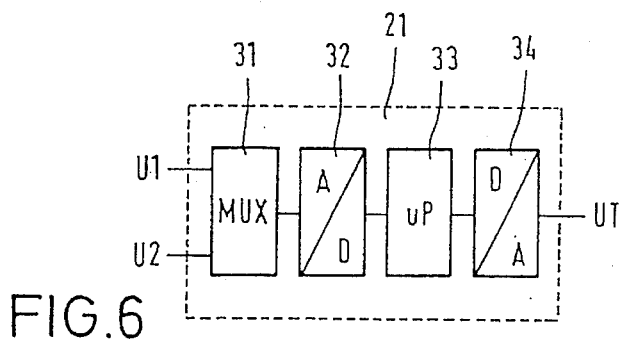

The implementation for generation of $U_T$ from $U_2$ and $U_2$ through discrete components described for drawing FIG. 5, can —with advantage —also be replaced by a computer building block with a microprocessor (33), multiplexer (31), A/D- (32) and D/A functions (34) as well as corresponding software operating according to equation 3 above. Drawing FIG. 6 shows a building block 21 of this kind.

Figure 7:
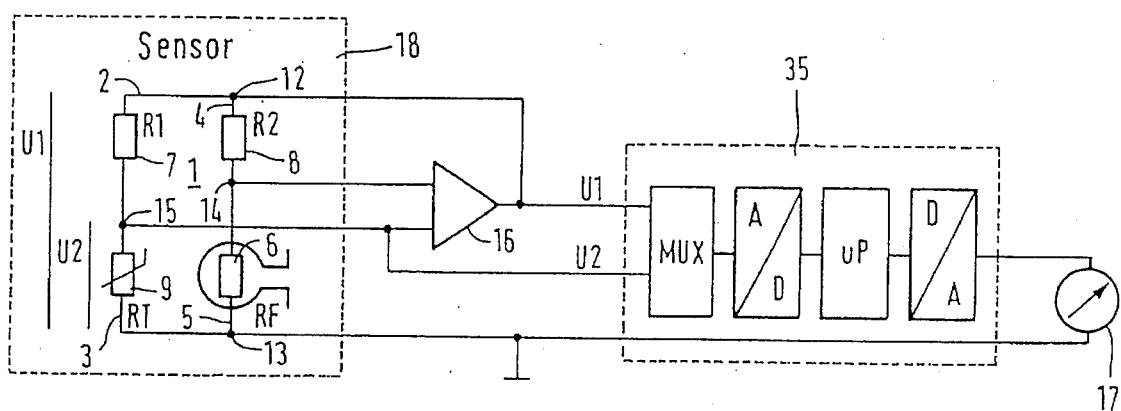

In a further step (drawing FIG. 7) it is evident to perform all signal processing - in particular also the weighted superimposition of the measurement quantity $U_1$ (bridge supply voltage) and the correction voltage $U_T$—by means of a computer building block 35. Expediently this building block also comprises microprocessor, multiplexer as well as A/D and D/A functions. The software must be adapted accordingly. In this case too —since via $U_1$ and $U_2$ both the ambient temperature and also the bridge voltage are known to the computer building block - a temperature compensation can be realized over the entire pressure measurement range. For this, the relationships between measured bridge voltage, temperature and 'true' pressure are determined experimentally once. Then in Pirani operating instruments the 'true' pressure may be calculated from the input quantities $U_1$ $_{and}$ $_{U2}$ by software routines through tables and/or approximation systems.

In the designs according to drawing FIGS. 2 to 3 and 5 to 7 the modifications required for implementation of the improved temperature compensation are limited to the measuring instrument. Existing measuring cells may, therefore, be operated with modified measuring instruments. In the design example according to drawing FIG. 4 an additional connection line is indeed required between measuring instrument and sensor; however, the accuracy of the temperature compensation is much improved compared to DE-PS 32 30 405 which represents the current state-of-the-art where also an additional connection line must be present.

I claim:

1. A process for operating a regulated heat conduction vacuum gauge, said heat conduction vacuum gauge having a regulated supply voltage, $U_1$, and a Wheatstone Bridge supplied by said regulated supply voltage, said Wheatstone Bridge having a gauge filament (6), a temperature-dependant resistance (9), and a voltage $U_2$ across said resistance (9), said process comprising the steps of:

subtracting said $U_2$ voltage from said $U_1$ voltage, to form a voltage, $U_4$;

dividing said $U_2$ voltage by said $U_3$ voltage to form a voltage signal, $U_T$, indicative of a temperature of said resistance; and superimposing said $U_T$ voltage on said bridge supply voltage, $U_1$.

2. The process according to claim 1, wherein said subtracting, dividing, and superimposing steps are carried out using a building block (19).

3. A process for operating a regulated heat conduction vacuum gauge, said heat conduction vacuum gauge having a regulated supply voltage, $U_1$, and a Wheatstone Bridge supplied by said regulated supply voltage, said Wheatstone Bridge having a gauge filament (6), a temperature-dependant resistance (9), a voltage $U_2$ across said resistance (9), and a current, $I_R$, flowing through said resistance (9), said process comprising the steps of:

determining said $U_2$ voltage;

recording said $I_R$ current;

combining said determined and recorded values for said $U_2$ voltage and said $I_R$ current together according to Ohm's Law to form a voltage signal, $U_T$, corresponding to a resistance value of said resistance (9), and indicative of a temperature of said resistance (9); and superimposing said $U_T$ voltage on said bridge supply voltage, $U_1$.

4. A process according to claim 3, wherein, in said recording step, said $I_R$ current is recorded using a current-to-voltage converter (36, 37).

5. A process according to claim 3, wherein, in said combining step, said $U_T$ voltage is found using a building block (38).

6. A circuit for regulating a heat conduction vacuum gauge, said heat conduction vacuum gauge having a regulated supply voltage, $U_1$, and a Wheatstone Bridge supplied by said regulated supply voltage, said Wheatstone Bridge having a gauge filament (6), a temperature-dependant resistance (9), and a voltage $U_2$ across said resistance (9), said circuit comprising:

a building block for forming from said $U_1$ and $U_2$ voltages, a voltage signal, $U_T$, indicative of a temperature of said temperature-dependant resistance; and electronic component means for superimposing said $U_T$ voltage on said supply voltage, $U_1$.

7. A circuit according to claim 6, wherein said building block includes a subtraction stage (27) and a divider circuit (29).

8. A circuit according to claim 6, wherein said building block includes a microprocessor (33), a multiplexer (31), an analog-to-digital conversion means (32), and a digital-to-analog conversion means (34).

\* \* \* \* \*